(12) United States Patent
Stoppek

(10) Patent No.: US 6,703,577 B2
(45) Date of Patent: Mar. 9, 2004

(54) METHOD OF MAKING CLOSED CAVITY PISTONS

(75) Inventor: Robert J. Stoppek, Huxley, IA (US)

(73) Assignee: Sauer-Danfoss Inc., Ames, IA (US)

( * ) Notice: Subject to any disclaimer, the term of this patent is extended or adjusted under 35 U.S.C. 154(b) by 11 days.

(21) Appl. No.: 10/166,470

(22) Filed: Jun. 10, 2002

(65) Prior Publication Data

US 2003/0226876 A1 Dec. 11, 2003

(51) Int. Cl.⁷ .................. B23K 11/00; B23K 11/14; B23P 15/10
(52) U.S. Cl. ............. 219/61; 219/93; 219/104; 29/888.04
(58) Field of Search .............. 219/59.1, 60 R, 219/61, 81.1, 91.2, 93, 78.01, 101, 104; 29/888.04–888.08; 123/12, 269, 279, 45 R–47 AB

(56) References Cited

U.S. PATENT DOCUMENTS

| | | | |
|---|---|---|---|
| 3,596,570 A | * 8/1971 | Kenyon | 92/168 |
| 3,695,150 A | * 10/1972 | Salzmann | 92/169.1 |
| 3,807,285 A | * 4/1974 | Phillips | 92/255 |
| 4,029,253 A | 6/1977 | Cartossi | |
| 4,110,888 A | * 9/1978 | Mutou | 29/404 |
| 4,137,828 A | * 2/1979 | Senn | 92/117 R |
| 4,210,091 A | * 7/1980 | Erba | 413/35 |
| 4,216,570 A | * 8/1980 | Farris et al. | 29/434 |
| 4,216,704 A | * 8/1980 | Heyl | 92/78 |
| 4,630,958 A | * 12/1986 | McCallister | 403/257 |
| 4,677,271 A | 6/1987 | Opprecht | |
| 4,706,550 A | * 11/1987 | Bullat | 92/260 |
| 4,747,340 A | * 5/1988 | Schellmann et al. | 92/222 |
| 4,815,360 A | * 3/1989 | Winterle | 92/255 |
| 5,092,224 A | * 3/1992 | Rozek | 92/109 |
| 5,213,025 A | * 5/1993 | Rozek | 92/109 |
| 5,507,258 A | * 4/1996 | Sasaki | 123/193.6 |
| 5,553,378 A | * 9/1996 | Parekh et al. | 29/888.044 |
| 5,590,905 A | * 1/1997 | Cuevas | 280/737 |
| 5,651,303 A | * 7/1997 | Fish | 92/128 |
| 5,778,846 A | * 7/1998 | Mielke | 123/193.6 |
| 6,026,777 A | * 2/2000 | Kemnitz et al. | 123/193.6 |
| 6,089,617 A | 7/2000 | Craig et al. | |
| 6,102,606 A | * 8/2000 | Muller et al. | 403/270 |
| 6,250,206 B1 | * 6/2001 | Johnson | 92/158 |
| 6,381,842 B2 | * 5/2002 | Kato et al. | 29/888.044 |
| 6,491,206 B2 | * 12/2002 | Stoppek | 228/114.5 |
| 6,530,149 B2 | * 3/2003 | Sugiura et al. | 29/888.042 |
| 6,532,655 B1 | * 3/2003 | Ahn et al. | 29/888.042 |
| 2002/0139207 A1 | * 10/2002 | Stoll et al. | |

FOREIGN PATENT DOCUMENTS

| | | | |
|---|---|---|---|
| DE | 19537928 A1 | * | 4/1997 |
| JP | 2254052 A | * | 5/1974 |
| JP | 411013826 A | * | 1/1999 |
| JP | 11062906 A | * | 3/1999 |
| JP | 02001165114 A | * | 6/2001 |

* cited by examiner

*Primary Examiner*—Kiley Stoner

(57) ABSTRACT

A method of securing a cap on a piston body includes forming a first annular V-shaped surface at an open end of a cylindrical piston body; forming a second annular V-shaped surface on an annular surface of an oil conduit in the interior center of the piston body; forming a cap to close the open end of the piston body and forming a pair of annular surfaces therein which are flat in shape and in contact with first and second annular V-shaped surfaces on the piston body; placing the cap over the open end of the piston body and thereby placing the annular surface on the cap and the body in close intimate contacting relation; and welding the respective annular surface of the cap and the piston body together by subjecting the cap and body to an extreme high current density to fuse respective contacting annular surfaces together.

5 Claims, 3 Drawing Sheets

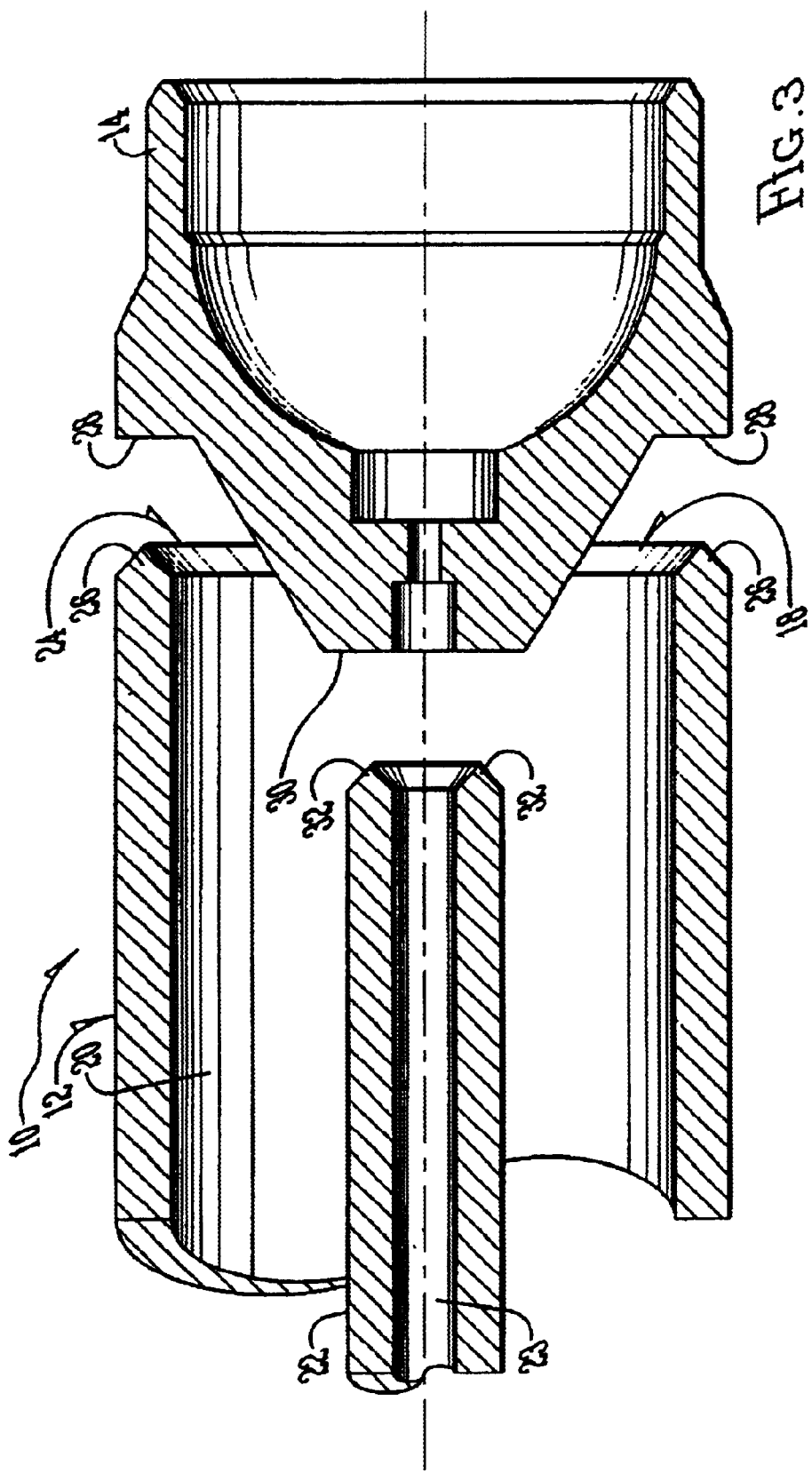

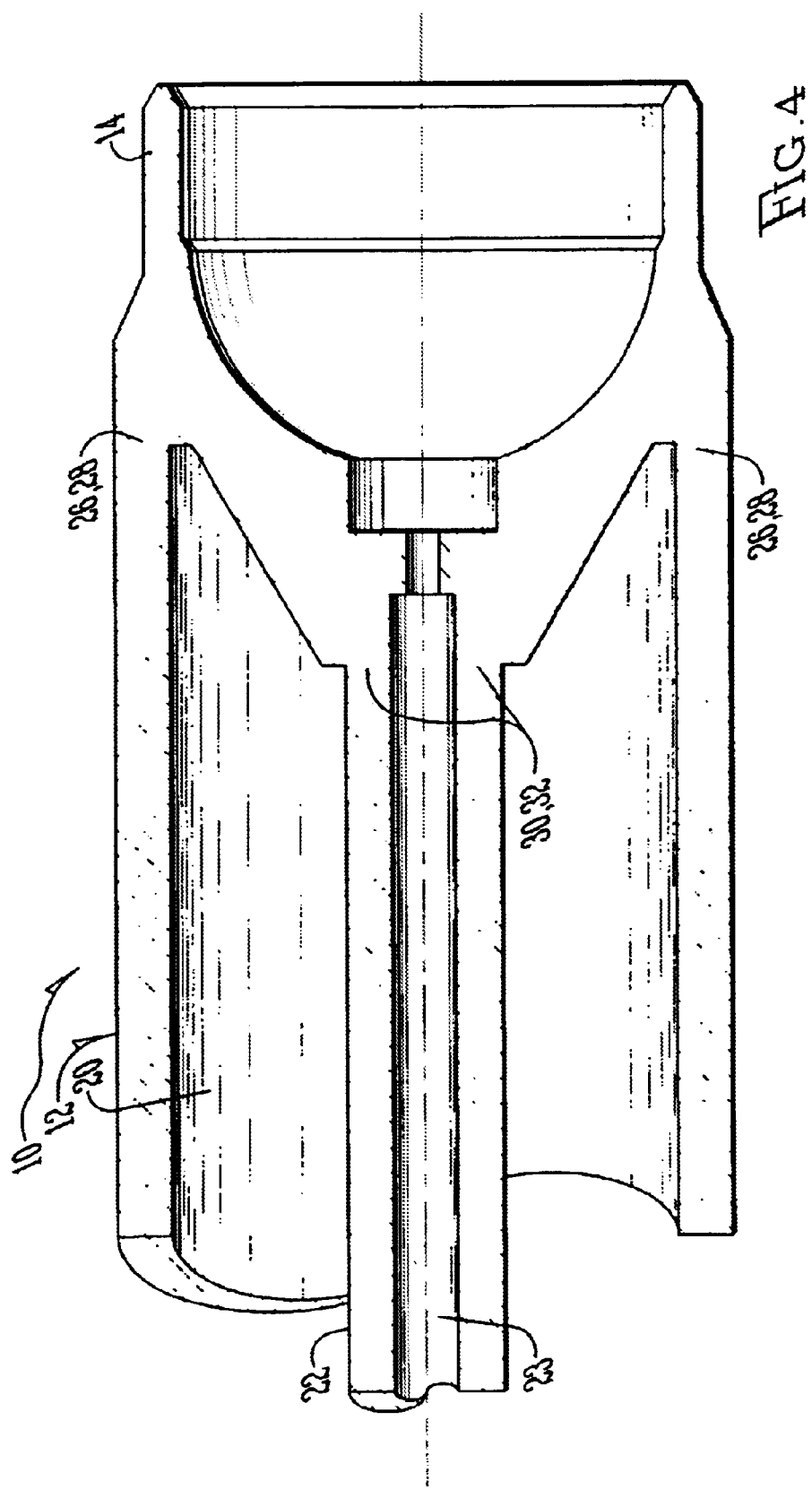

METHOD OF MAKING CLOSED CAVITY PISTONS

BACKGROUND OF THE INVENTION

The present invention relates to the field of hydrostatic units such as transmissions, pumps and motors. More particularly, this invention relates to closed cavity or reduced oil volume pistons that slidably reciprocate in the cylinder bores of hydrostatic units.

Conventional closed cavity pistons have been utilized in hydrostatic units for a variety of agricultural, turf care and construction equipment. A conventional closed cavity or reduced oil volume piston has an elongated cylindrical main body and a truncated cylindrical cap. One end of the main body is closed and the other end has a deep annular cavity formed therein. The cap has opposite closed and open ends. The open end includes an annular groove such that the cap registers and mates with the stem and outer wall of the main body at its open end. Then the cap and main body are conventionally welded together along a single transverse plane where their respective open ends meet. The result is a lightweight hollow closed cavity piston, but the cost and complexity of the machining operation make it a relatively expensive piston.

It is therefore a principal object of this invention to provide a method of simultaneously securing together by projection welding a cap and piston body having longitudinally spaced contact surfaces.

These and other objects will be apparent to those skilled in the art.

SUMMARY OF THE INVENTION

A method of securing a cap on a piston body includes forming a first annular V-shaped surface at an open end of a cylindrical piston body; forming a second annular V-shaped surface on an annular surface of an oil conduit in the interior center of the piston body; forming a cap to close the open end of the piston body and forming a pair of annular flat surfaces therein which are in contact with the first and second annular flat shaped surfaces on the piston body; placing the cap over the open end of the piston body and thereby placing the annular surface on the cap and the body in close intimate mating relation; and welding the respective mating annular surface of the cap and the piston body together by subjecting the cap and body to an extreme high current density to force respective mating annular surfaces together.

BRIEF DESCRIPTION OF THE DRAWINGS

FIG. 3 is an exploded assembly view in longitudinal cross-section of the righthand end of FIG. 2.

FIG. 4 is a central longitudinal large scale cross-sectional view of the forward portion of the piston of FIG. 1.

DETAILED DESCRIPTION OF THE PREFERRED EMBODIMENT

Figure 1:
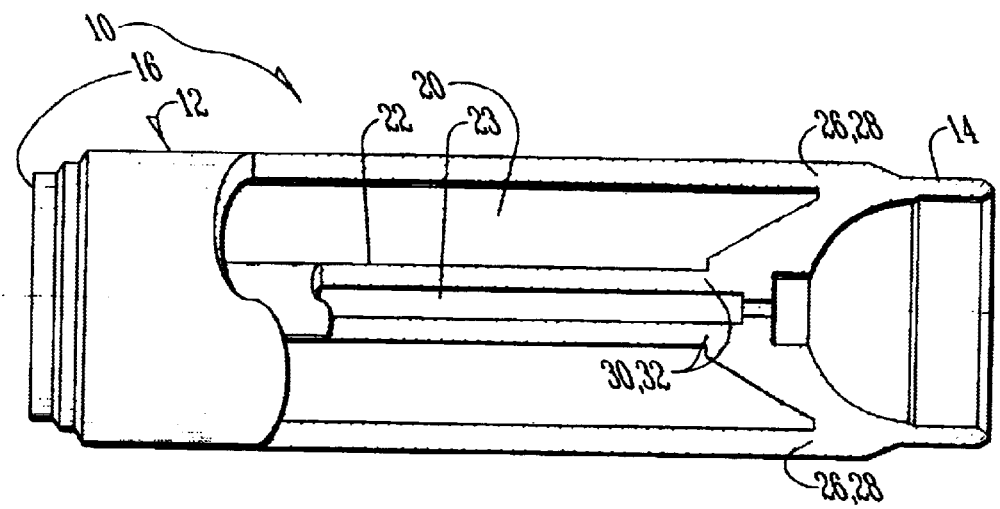
FIG. 1 is a central longitudinal cross-sectional view of the assembled piston of this invention.

A piston 10 is shown in FIG. 1. The piston 10 includes a steel piston body 12, a steel piston cap 14. The piston body 12 has a closed end 16; an open end 18 (FIG. 2), and an annular interior cavity 20. A stem 22 protrudes from the closed end 16 of the piston body. The open end 18 of the body 12 lies in the same plane as the rim 24 of the piston body 12. The piston cap 14 is cylindrical like the piston body 12. (FIG. 2).

With reference to FIG. 3, a first V-shaped contact surface 26 is formed at rim 24 of body 12. A second flat shaped contact surface 28 is formed in cap 14 and contacts surface 26 of body 12 as best shown in FIG. 3.

Figure 2:
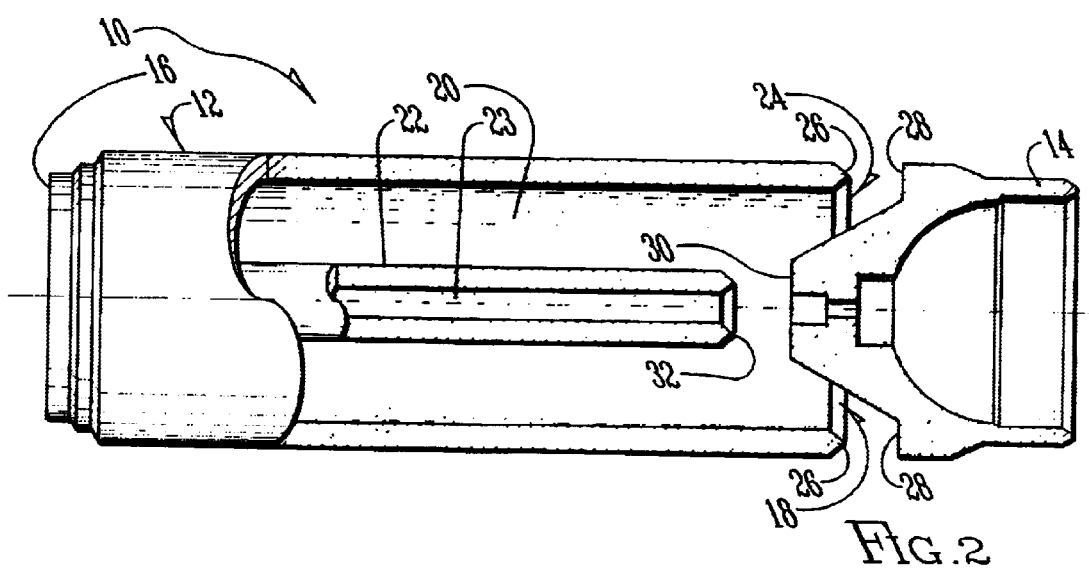
FIG. 2 is an exploded assembly view in longitudinal cross-section of the piston of FIG. 1.

Similarly, a flat shaped contact surface 30 is formed on the inner end of stem 22 (FIG. 3) and engages a V-shaped contact surface 32 on the inner end of cap 14 (FIGS. 2 and 3). It should be noted that the separate contact surfaces 26 and 28, and 30 and 32, are longitudinally spaced with respect to each other, and collectively form pairs of mating annular surfaces 26, 28 and 30, 32. It should be understood that at least one annular surface in the pairs of mating annular surfaces 26, 28 and 30, 32 should be V-shaped, and the opposing surface should be flat. Thus the flat and V-shape of the mating surfaces on the cylinder and the cap could be interchanged regardless of which single surface was V-shaped and which surface was flat, providing that each pair of mating annular surfaces had one of each.

The body 12 is preferably comprised of a 4140 mild carbon alloy with a high nickel contact (e.g. Manganese WT % 0.0). A hardness of 50 to 55 Rc is required on the piston body to provide the proper tribological wear characteristics between the piston and cylinder block. The cap 14 will either be made of 4140 or a mild carbon alloy.

During the welding process, the surfaces 30 and 32, and 26 and 28, respectively, are fused together to create the monolithic structures shown in FIGS. 1 and 4. See the numerals 26, 28 and 30, 32 in both of these figures.

The joining will require simultaneous projection welding of both inner and outer joints of the piston assembly. It is imperative that the inner and outer joints form a solid homogenous annular weld that is impermeable to fluid. It is also critical that the inner weld does not close off the lubrication hole 23 through the center of the piston. Defects of any type cannot be tolerated in the weld regions.

Particular attention must be taken regarding the concentricity between the piston cap and body. The alignment between centers of the two parts must be controlled during the projection welding operation.

Flash associated with welding is permissible in the pistons' internal cavity but must be controlled in the area of the lubrication hole and the outer diameter of the piston. The outer diameter of the cap is smaller than the outer piston body diameter. Flash on the outer joint cannot protrude past the inlet chamfer located on the outer diameter of the piston body diameter. This surface must remain clean because of its bearing function.

Resistance or projection welding is a thermoelectric process in which heat is generated by passing an electric current through the parts to be joined. The process uses electrodes to push the parts together to establish initial contact resistance. Once physical contact is established, a carefully controlled combination of resistance generated heat and physical pressure is applied through the electrodes to create the actual joint. The amount of heat generated is a function of the amount of current applied, the length of time it is applied, and the resistance profile between the parts being joined.

The specific type of projection welding preferred for the instant invention employs an extremely strong pulse of welding current, produced by discharging a bank of capacitors used to store energy via a pulse transformer. This system utilizes a stored energy method to discharge current instantaneously as opposed to conventional resistance welding that constantly feed on current through welding. Resembling a bucket of stored water more than a spigot connected to a constantly available source, this system draws energy from a power line and stores it in its capacitors. This strong current pulse discharged in milliseconds gives the weld method the following characteristics/benefits:

Exactly the amount of energy required and no more is introduced at the joint to produce welding.

The concentration of heat generated results in a better weld structure and only affects a narrow zone, yielding higher strength values.

Heating of the work piece is so slight that heat conduction and deformation are insignificant.

High reliability due to exact weld reproducibility. The true benefit of this welding is the short cycle time and controlled energy dissipation of the process. This avoids distortion, eliminating subsequent piston socket finishing operations and minimizes the overall joint micro gain structure for increased strength.

It is therefore seen that this invention will achieve at least all of its stated objectives.

What is claimed is:

1. A method of securing a cap on a piston body, comprising, forming a first annular contact surface at an open end of a cylindrical piston body, forming a second annular contact surfaces on an annular surface of an oil conduit in the interior center of the piston body, forming a cap to close the open end of the piston body and forming a pair of annular surfaces thereon which are in engagement with the first and second annular surfaces on the piston body, placing the cap over the open end of the piston body and thereby placing the annular surfaces on the cap and the body in close intimate engaging relation, to form two pairs of mating annular surfaces, making at least one annular surface of the annular surfaces in each pair of mating annular surfaces in the shape of a V, and simultaneously welding the respective engaged annular surface of the cap and the piston body together by subjecting the cap and body to an extreme high current density to fuse the respective engaged annular surfaces together.

2. The method of claim 1 wherein respective pairs of mating annular surfaces comprise one flat annular surface and one V-shaped annular surface.

3. The method of claim 1 wherein one pair of contact surfaces is located radially inwardly in offset relation to the other pair of contact surfaces.

4. The method of claim 1 wherein one pair of contact surfaces is located radially inwardly in offset relation and longitudinally spaced to the other pair of contact surfaces.

5. The method of claim 1 wherein the respective pairs of mating annular surfaces are longitudinally spaced from each other.

* * * * *